Sept. 8, 1959  S. E. McCLINTOCK  2,903,684
SPEED ALARM INDICATOR FOR AUTOMOTIVE VEHICLES
Filed March 6, 1957  2 Sheets-Sheet 1
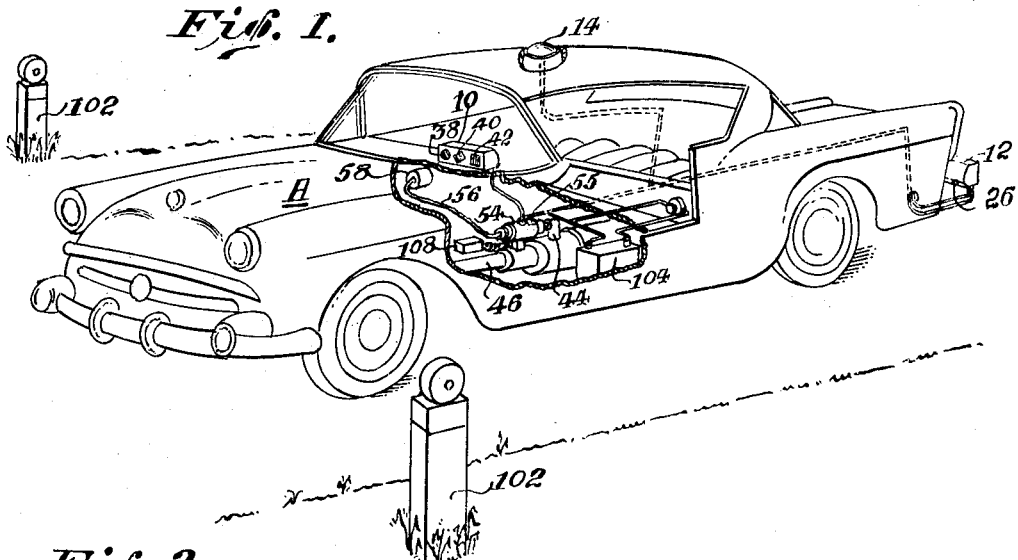
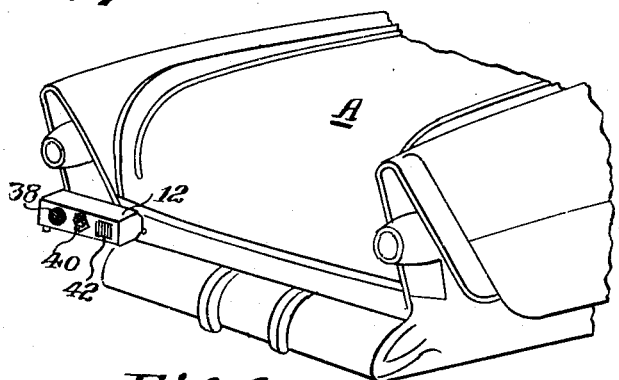
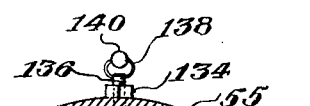
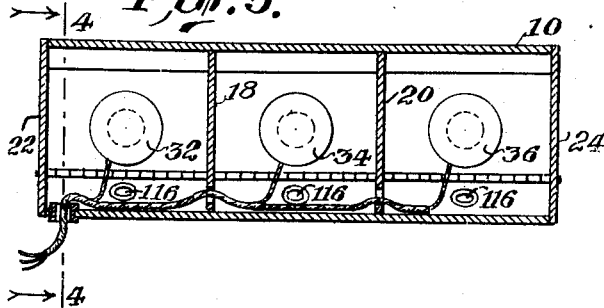
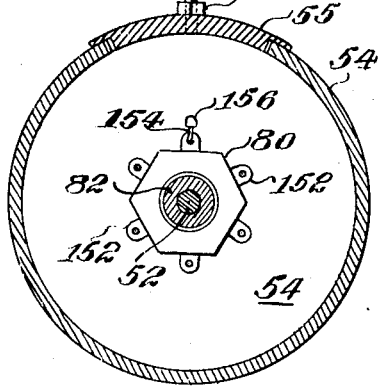
INVENTOR.
Sherman E. McClintock.
BY
Mason & Mason
Attorneys.

Sept. 8, 1959        S. E. McCLINTOCK        2,903,684
SPEED ALARM INDICATOR FOR AUTOMOTIVE VEHICLES
Filed March 6, 1957        2 Sheets-Sheet 2
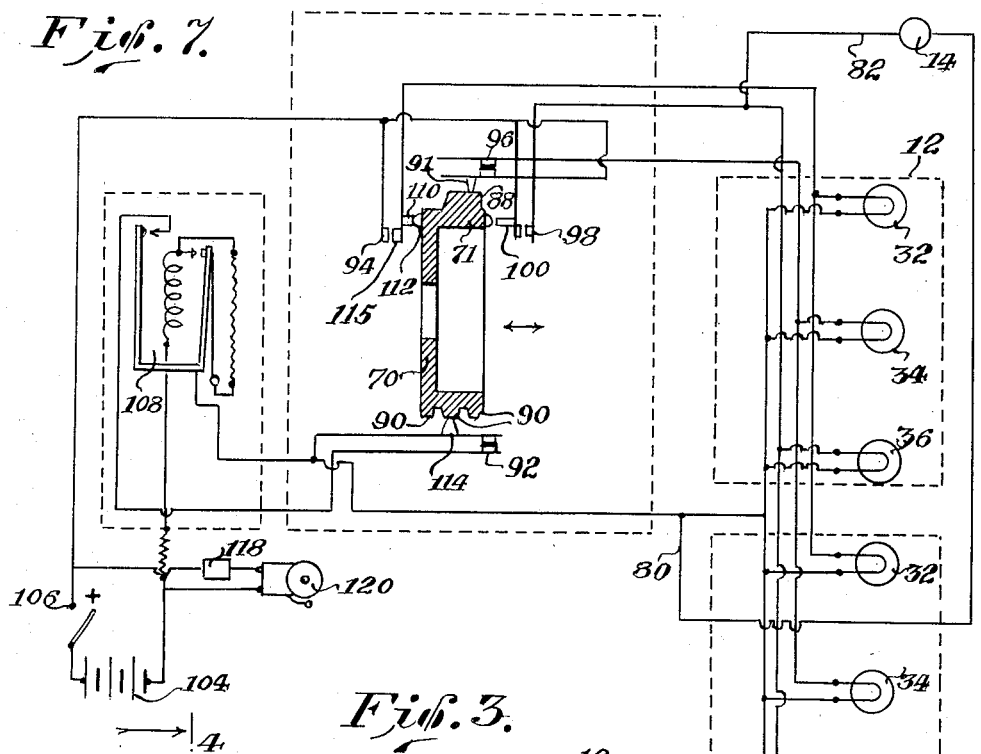
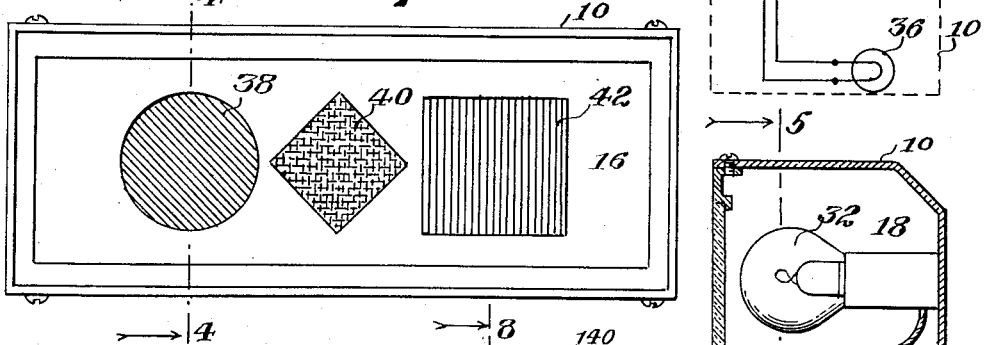
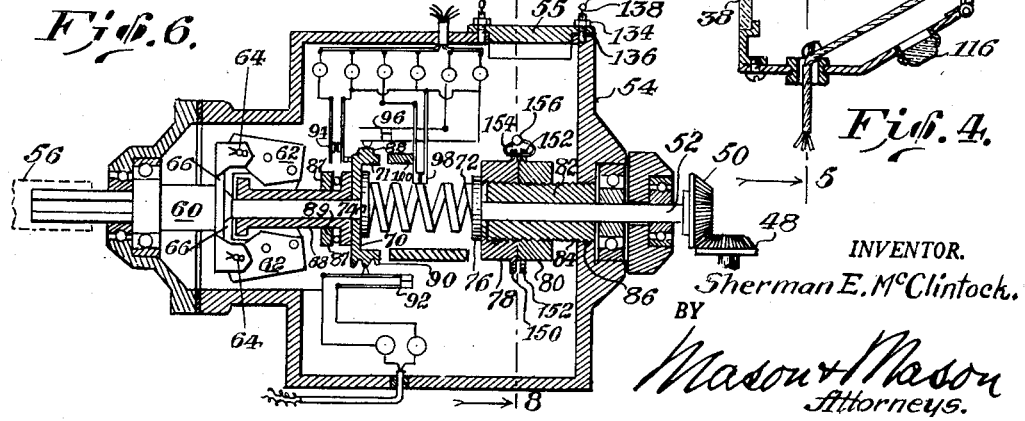
INVENTOR.
Sherman E. McClintock.
BY
Mason & Mason
Attorneys.

United States Patent Office 2,903,684
Patented Sept. 8, 1959

2,903,684
SPEED ALARM INDICATOR FOR AUTOMOTIVE VEHICLES

Sherman Edward McClintock, Orlando, Fla., assignor of one-half to Paul J. Stine, Orlando, Fla.

Application March 6, 1957, Serial No. 644,282

6 Claims. (Cl. 340—263)

The present invention relates to a speed alarm indicator system for installation on an automotive vehicle, the same being particularly adaptable for indicating to the driver, and to observers outside of the vehicle the speed the vehicle is traveling within certain designated speed zones within a town or city. For instance the alarm indicator of this invention will show to the driver and to an observer outside the vehicle he is driving, whether the driver is proceeding above the maximum speed limits of a plurality of speed zones within the city or town through which he is driving. The device of this invention will also indicate whether the driver is proceeding at an illegal speed on highways. Assuming that in a given State, the speed limit on an open highway is 65 miles an hour, the outlying districts of cities or towns is 45 miles an hour, the residential districts of which are 45 miles an hour and the business districts of which are 25 miles an hour, then the device of this invention will indicate simultaneously, both to the driver and to an observer outside of his car, the speed of travel of the car within these speed zones. Said device will also show by the same indicating means when the vehicle is approaching in speed the next higher speed zone.

The principal object of the invention therefore is to provide a speed alarm indicator, visible at all times both to the vehicle driver and to an observer, such as a law officer, the speed the vehicle is traveling both on the highway, and within a plurality of speed zones, and give a further indication when the speed of the vehicle approaches the speed limit of the speed zone next above that of the speed the vehicle is traveling, whilst traveling through a plurality of speed zones.

An additional object is to provide a series of flashing signals to indicate intermediate speeds of the vehicle, and to indicate when the maximum highway speed limit has been exceeded.

Another object is to provide a road warning actuating means for notifying the driver, that is located on the highway, of the approach of a restricted zone or zones of a town or city.

Other objects will appear hereinafter throughout the specification.

In the drawings:

Figure 1 is a perspective view of a highway and a vehicle thereon, partly broken away, equipped with the device of this invention;

Figure 2 is a partial view showing in perspective the rear signalling unit;

Figure 3 is a front view of one of the signal units;

Figure 4 is a vertical section, taken on the line 4—4 of Figure 3;

Figure 5 is a vertical section taken on the line 5—5 of Figure 4;

Figure 6 is a vertical section of the speed responsive unit and the switches connected thereto; and Figure 7 is a diagram of the electrical circuit and its connections to the elements of the system; and Figure 8 is a transverse vertical section taken on the line 8—8 of Figure 6.

Briefly, the present invention is concerned with a system for notifying each driver of the vehicle driven by him, as well as an observer outside of a vehicle of the speed range in which the vehicle is traveling, and additionally notifying them when the vehicle's speed is approaching a higher speed range. The foregoing relates to the time when the vehicle is traveling through one or more restricted zones. When the vehicle is on the open highway, a signal is operated when the vehicle is traveling within the speed range, and another signal is operated when the vehicle has exceeded this speed range. Additionally another signal is operated to notify the driver that he is entering a community provided with one or more speed zones.

Referring to the drawings A indicates a motor vehicle having a forward signal casing 10, a rear signal casing 12, and a dome signal casing 14. Preferably the forward signal casing and the dome signal casing are provided with translucent windows on both sides thereof, i.e. casing 10 has transparent windows forming the front and rear walls thereof. An outside observer may view the signals from both in front or in rear of the vehicle, and may also view the signal from casing 14 from any side of the vehicle. Casing 12 is provided only with transparent windows facing rearwardly as shown at 116 in Figure 4.

There has been illustrated in the several figures, visual signaling means, but it will be understood that audible signals of different tones may be substituted therefore, or used in conjunction therewith by merely placing said audible signals in the same circuits as the visual signals or in place thereof in said circuits.

Located in each casing 10 and 12 are a series of partitions 18 and 20 which together with ends 22 and 24 provide a plurality of closed compartments, housing signal lights 32, 34 and 36. As shown in Figures 1, 2 and 4 the translucent window may have transparent portions 38, 40 and 42 to indicate to a color blind person, the colors green, amber and red respectively.

Referring now to Figures 1 and 6, 44 is a power take-off from the engine drive shaft 46. The power take-off rotates the drive pinion 48 which drives through the driven gear 50, the drive shaft 52, located in the casing 54. The left end of shaft 52 may be connected to the cable run 56 that drives the speedometer 58.

A collar 60 is splined to shaft 52 and carries a pair of governor weights 62 that are pivoted thereto at 64. The inner ends of the weights are provided with arms 66, which when the weights fly out under centrifugal force, bear against and move the spool 68 to the right as seen in Figure 6. As will be apparent, the spool is freely slidable on shaft 52. Cup-shaped member 70 surrounds shaft 52, is fixed to spool, these parts being non-rotative. Said member 70 has a rim 71. Movement to the right of the spool, causes rightward movement of cup-shaped member. This movement however, is opposed by expansion spring 72, whose left end has a collar 74 fixed to the cup-shaped member, and whose right end has a collar 76 bearing against nut 78. This nut and its lock-nut 80 threadedly engage sleeve 82 that also threadedly engages threads 84 of the casing aperture 86. Any suitable means, such as a forked member 87 extends inwardly from the casing so that the spool and the cup-shaped member 70 will not rotate. A flat portion 89 on the spool is engaged between the legs of the forked member to prevent rotation of said spool 68 and member 70 while permitting the same to slide along the shaft 52. As viewed in Figure 6 rim 71 has a single raised portion or contact 88 and as many lower raised portions or contacts 90, three being illustrated as there are signals such as the three different colored lights 32, 34, 36.

The numerals 92, 94, 96 and 98 each indicate electrical spring switches the contacts of which are normally biased to separated or open position. These switches are closed by movements of the cup-shaped member 70 during its movement to the right as actuated by the flyweights 62 as the speed of rotation of the shaft increases in compressing spring 72, and the contacts of these switches are again closed when the speed of rotation of the shaft decreases, and the member 70 moves to the right as the spring 72 expands. Switch 98 is provided with a finger 100 for engagement by the rim 71 at the extreme end of its rightward movement.

Referring to Figure 1, the numeral 102 shows a pair of posts of a roadside short wave radio or radar system. When a vehicle passes between the posts 102, a signal is sent to a central police station, not shown, and to car interior to notify the driver that he has passed into a restricted zone.

Referring now to Figures 1 and 7 which latter shows the wiring system, the numeral 104 indicates a battery and 106 a hand operated switch. Cup-shaped member 70 has been shown somewhat diagrammatically, but its purpose and operation will be apparent, as set forth hereinafter. Raised portion 110 on switch 92 is adapted for contact by contact 112, and contact 114 on switch 92 is adapted for contact by lower contacts 90.

Switch 92 controls flasher 108. In Figure 7, numbers 10 and 12 diagrammatically indicate forward and rear casings, each with its green light 32, amber light 34 and red light 36. Each green light 32 is controlled by switch 94, each amber light 34 is controlled by switch 96 and each red light 36 and the red light in casing 14 is controlled by switch 98.

However, during the lighting period of each of these series of lights, they are periodically interrupted by flasher 108 as controlled by switch 92, hereinafter explained. Flasher 108 has been illustrated diagrammatically, but it will be understood that any suitable flasher mechanism may be used, such as that disclosed in the patent to Schmidinger No. 2,103,276, granted December 28, 1937. When flasher switch opens the green, amber or red lights flash according to the switch 94, 96 or 98 that happens to be closed.

Operation

Assuming the car is proceeding at a speed of 25 miles an hour or less with switch 106 closed. At this time member 70 is in its leftmost position with contacts 110 and 112 in engagement, and contact 114 engaging the rightmost contact 90. Contacts 92 are now in engagement.

When the vehicle picks up speed to between 25 and 35 miles per hour, contacts 110 and 112 remain in engagement, but as member 70 moves to right, rightmost contact 90 rides off the contact 114, opening contacts 92 and thereby causing the green lights to flash.

When the vehicle reaches a speed of between 35 and 45 miles per hour, contact 88 engages 91, closing switch 96 and lighting amber lights with parts shown as in Figures 6 and 7. At this time, switch 94 has been opened, shutting off green lights, while contact 114 engages middle contact 90 causing a continuous amber light to be shown in each light unit 10 and 12. When a speed of between 45 and 55 miles is attained, switch 96 remains closed but middle contact 90 rides off the contact 114 thus causing the amber lights in each casing to flash.

When a speed of between 55 and 65 miles an hour is reached switch 96 opens, and switch 98 closes. At this time the leftmost contact 90 is engaged by contact 114 thus shorting the flasher unit and maintaining a steady red light in both casings 10 and 12 and in the dome 14. This condition obtains until a speed of 65 miles an hour is exceeded whereupon the contact 114 rides off the leftmost contact 90, thus opening switch 92 to cause a continuous flashing of the red lights in casings 10, 12 and 14. This condition continues as long as the speed of 65 m.p.h is exceeded as the rim 71 continues to engage finger 100 to maintain switch 98 closed, and the switch 92 is maintained open to continue the flashing of the red lights.

It will be understood that the ranges, in which the several lights will be illuminated and flash, may be adjusted by regulating the tension of spring 72. This is accomplished by rotating the nut 78 on the sleeve 82 and locking the same in any adjusted position by lock-nut 80.

A radio actuated switch closed by crossing beam at 102 sounds alarm 120 in the vehicle.

As shown in Figures 4 and 5 the front casing 10 has a series of small jewel type lenses 116 which direct light rays downwardly in the front signal casing so as not to shine directly in the eyes of the vehicle driver, but which at the same time notify the driver of the compartment in which one of the lights is located.

A suitable sealing means may be provided both on the casing for the centrifugal device shown in Figure 6, and to prevent tampering with the adjustment of the nut 76 and its locking nut 80. It will be understood that any suitable structure may be provided to effect such sealing. As illustrative of one means for effecting a double sealing arrangement, the casing 54 is provided with a removable cover 55, as shown in Figures 6 and 8. Screw threaded studs 136 cause the cover 55 to clampingly engage the casing, inasmuch as nuts 134 threadedly engage these studs 136. Each nut must be backed off its stud in order to free the cover 55. However, these nuts cannot be backed off the studs until the seal is broken. This seal consists in each case of a wire 138, the ends of which are connected by lead 40. The wires 138 extend through apertures in the studs as will be readily apparent.

Nut 80 when locked to nut 76 will be in such position that the ears 150 and 152 will present aligned apertures, or apertures which are substantially in alignment. A wire 154 is threaded through a portion of these aligned apertures and the ends of it are connected by a thread 156. Thus, both the casing aperture and the nut 78 are sealed, and it will be necessary to break both seals in order to change the adjustment of the nut 78. Preferably these seals will be attached by the police department.

The above description and drawings disclose a single embodiment of the invention, and specific language has been used in describing the several figures. It will, nevertheless, be understood that no limitations of the scope of the invention are thereby contemplated, and that various alterations and modifications may be made such as would occur to one skilled in the art to which the invention relates.

I claim:

1. In an electric speed alarm system for an automotive vehicle having a transmission provided with a rotary member, a primary electric circuit, means connecting said circuit to a source of power, a shunt circuit connected to said primary circuit, a flasher device in said shunt circuit, a centrifugal means, means connecting said centrifugal means to the said rotary member of said transmission whereby said centrifugal means responds to the speed of said vehicle, a plurality of visual indicator means for indicating the speed the vehicle is travelling within different speed ranges connected to said primary and secondary circuits, a switch for said flasher device operatively connected to said visual signal means, and a switch for each of said visual indicator means, said centrifugal means having means for successively making and breaking each of said switches of said visual indicator means and said flasher switch means as the speed of the vehicle increases or decreases, and said means for making and breaking said last named switches being constructed and adapted to maintain each of said switches closed during a definite speed range of said vehicle and for simultaneously operating said flasher switch during a portion only of at least one of said speed ranges, whereby to flash said visual indicating means.

2. In an electric speed alarm system for an automotive vehicle having a transmission provided with a rotary member, a primary electric circuit, means connecting said circuit to a source of power, a shunt circuit connected to said primary circuit, a flasher device in said shunt circuit, centrifugal means, means connecting said centrifugal means to the said rotary member of said transmission whereby said centrifugal means responds to the speed of said vehicle, a plurality of visual indicator means for indicating the speed the vehicle is travelling within different speed ranges connected to said primary and secondary circuits, a switch for said flasher device operatively connected to said visual signal means, and a switch for each of said visual indicator means, said centrifugal means having means for successively making and breaking each of said switches of said visual indicator means and said flasher switch means as the speed of the vehicle increases or decreases, and said means for making and breaking said last named switches being constructed and adapted to maintain each of said switches closed during a definite speed range of said vehicle and for simultaneously operating said flasher switch during a portion only of said speed ranges, whereby to flash said visual indicating means.

3. In an electric speed alarm system for an automotive vehicle having a transmission provided with a rotary member, a primary electric circuit, means connecting said circuit to a source of power, a shunt circuit connected to said primary circuit, a flasher device in said shunt circuit, centrifugal means, means connecting said centrifugal means to the said rotary member of said transmission whereby said centrifugal means responds to the speed of said vehicle, a plurality of visual indicator means for indicating the speed the vehicle is travelling within different speed ranges connected to said primary and secondary circuits, a switch for said flasher device operatively connected to said visual signal means, and a switch for each of said visual indicator means and said flasher switch means as the speed of the vehicle increases or decreases, and said means for making and breaking said last named switches being constructed and adapted to maintain each of said switches closed during a definite speed range of said vehicle and for simultaneously operating said flasher switch during a portion only of at least one of said speed ranges whereby to flash said visual indicating means, said centrifugal means further including manual means for adjusting said centrifugal means whereby to operate said switches at a greater or lesser speed of rotation of said rotary transmission member.

4. In an electric speed alarm system for an automotive vehicle having a transmission provided with a rotary member, a primary electric circuit, means connecting said circuit to a source of power, a shunt circuit connected to said primary circuit, a flasher device in said shunt circuit, centrifugal means, means connecting said centrifugal means to the said rotary member of said transmission whereby said centrifugal means responds to the speed of said vehicle, a plurality of visual indicator means for indicating the speed the vehicle is travelling within different speed ranges connected to said primary and secondary circuits, a switch for said flasher device operatively connected to said visual signal means, and a switch for each of said visual indicator means, said centrifugal means having means for successively making and breaking each of said switches of said visual indicator means and said flasher switch means as the speed of the vehicle increases or decreases, and said means for making and breaking said last named switches being constructed and adapted to maintain each of said switches closed during a definite speed range of said vehicle and for simultaneously operating said flasher switch during a portion only of said speed ranges whereby to flash said visual indicating means, said centrifugal means further including manual means for adjusting said centrifugal means whereby to operate said switches at a greater or lesser speed of rotation of said rotary transmission member.

5. The structure of claim 1 wherein said visual indicator means comprises a casing located adjacent to the driver's seat, a second casing located rearwardly of the driver's seat of said vehicle, lamps in each of said casings, a dome signalling means located above the driver's seat, and circuit means connecting said dome signalling means to only one of said lamps in each of said casings whereby said dome signalling means is lit continuously during part of one of said speed ranges, and the same is lit intermittently during another part of the same speed range of said vehicle.

6. The structure of claim 2 wherein said visual indicator means comprises a casing located adjacent to the driver's seat, a second casing located rearwardly of the driver's seat of said vehicle, lamps in each of said casings, a dome signalling means located above the driver's seat, and circuit means connecting said dome signalling means to only one of said lamps in each of said casings whereby said dome signalling means is lit continuously during part of one of said speed ranges, and the same is lit intermittently during another part of the same speed range of said vehicle.

References Cited in the file of this patent

UNITED STATES PATENTS

| | | |
|---|---|---|
| 2,090,332 | O'Neil | Aug. 17, 1937 |
| 2,251,623 | Crofoot | Aug. 5, 1941 |
| 2,307,151 | Moore | Jan. 5, 1943 |
| 2,325,435 | Sykora | July 27, 1943 |
| 2,594,739 | Davis | Apr. 29, 1952 |